(12) United States Patent
Kuo et al.

(10) Patent No.: US 6,493,119 B1
(45) Date of Patent: Dec. 10, 2002

(54) SCALABLE DWDM NETWORK SWITCH ARCHITECTURE WITH WAVELENGTH TUNABLE SOURCES

(76) Inventors: Chien-Yu Kuo, 11613 Forest Spring Ct., Cupertino, CA (US) 95014; Niraj Gupta, 47634 Hoyt St., Fremont, CA (US) 94539; Ronald Garrison, 4434 Cedar Elm Cir., Richardson, TX (US) 75082

( * ) Notice: Subject to any disclaimer, the term of this patent is extended or adjusted under 35 U.S.C. 154(b) by 0 days.

(21) Appl. No.: 09/648,518

(22) Filed: Aug. 25, 2000

Related U.S. Application Data

(60) Provisional application No. 06/152,693, filed on Sep. 7, 1999, and provisional application No. 60/172,291, filed on Dec. 14, 1999.

(51) Int. Cl.[7] .............................................. H04B 10/20
(52) U.S. Cl. ..................... 359/128; 359/124; 359/117
(58) Field of Search ................................. 359/124, 128, 359/117; 385/16, 17

(56) References Cited

U.S. PATENT DOCUMENTS

| | | | |
|---|---|---|---|
| 5,726,788 A | * 3/1998 | Fee et al. ..................... 359/163 |
| 5,739,935 A | * 4/1998 | Sabella ......................... 359/128 |
| 5,805,320 A | 9/1998 | Kuroyanagi et al. ......... 359/117 |
| 5,903,686 A | 5/1999 | MacDonald .................. 385/16 |
| 5,953,141 A | 9/1999 | Liu et al. ...................... 359/124 |
| 5,953,143 A | 9/1999 | Sharony et al. .............. 359/128 |
| 5,959,767 A | * 9/1999 | Fatehi et al. ................. 359/341 |
| 5,973,809 A | 10/1999 | Okayama ..................... 359/128 |
| 6,005,697 A | 12/1999 | Wu et al. ..................... 359/117 |
| 6,128,115 A | * 10/2000 | Shiragaki ..................... 359/128 |
| 6,215,568 B1 | * 4/2001 | Bischoff ....................... 359/128 |

FOREIGN PATENT DOCUMENTS

WO       WO-9730529 A2 *   8/1997   ............. H04J/14/02

* cited by examiner

*Primary Examiner*—Leslie Pascal
*Assistant Examiner*—Christina Y Leung

(57) ABSTRACT

A network switch connecting N input optical fibers and N output optical fibers, each optical fiber carrying M wavelength channels. The network switch has a control unit, a plurality of demultiplexers connected to the input output optical fibers, a plurality of tunable channel units, a switch fabric and a plurality of combiners connected to the output optical fibers. The demultiplexers and tunable channel units provide the wavelength routing function and the switch fabric, which has M×N2 switch points, switches signals from input optical fiber to output fiber so that the switch can switch signals from one wavelength channel to another and from one input optical fiber to one or more output optical fibers of the optical network. The switch fabric is formed from a plurality of switch modules, one switch module for each incoming wavelength channel. The switch modules are also formed from partitionable arrangements of switch elements and combiners so that the switch fabric and switch can be scaled up and reconfigured on an "as needed" basis.

9 Claims, 5 Drawing Sheets

SCALABLE DWDM NETWORK SWITCH ARCHITECTURE WITH WAVELENGTH TUNABLE SOURCES

CROSS-REFERENCE TO RELATED APPLICATIONS

The present patent application claims priority from Provisional Patent Application No. 60/152,693, filed Sep. 7, 1999, and No. 60/172,291, filed Dec. 14, 1999, both of which are incorporated by reference herein.

BACKGROUND OF THE INVENTION

The present patent application is related to fiber optic networks, and, in particular, to switches for WDM and DWDM network systems.

In WDM (Wavelength Division Multiplexing) fiberoptic networks, optical signals are sent at predetermined wavelengths over optical fibers. Each predetermined wavelength forms a communication channel in the network and the wavelength (or frequency) of the optical signal is used to control the destination of the signal through the network. An advanced version of WDM networks is the DWDM (Dense Wavelength Division Multiplexing) network in which the number of wavelength channel is increased by reducing the channel wavelength separation. In DWDM networks, the communication channels are separated by 100 GHz, as set by the ITU (International Telecommunications Union) and the fiberoptic industry is already assuming an unofficial channel separation of 50 GHz for advanced DWDM networks.

In passing, it should be noted that the term, DWDM, is used to refer to both WDM and DWDM networks and other fiberoptic networks which rely upon wavelength to define communication channels, unless indicated otherwise.

In such fiberoptic networks, switches are used to select paths for optical signals through the optical fibers forming the networks, i.e., to direct optical signals from one optical fiber to another and from one wavelength channel to another. Hence switches tend to be large, complex and expensive systems; installation, repair and reconfiguration (if possible) are time-consuming and costly. It is desirable that a switch be scalable so as to meet the requirements of a DWDM network on an "as-needed" basis so as to avoid unwanted costs, that the switch be easily repaired and reconfigured to avoid costly "down time" for network in operation.

The present invention is directed toward such a fiberoptic switch.

SUMMARY OF THE INVENTION

The present invention provides for a network switch for a DWDM network having a plurality of optical fibers, each optical fiber carrying M wavelength channels. The network switch controllably switches signals on N input optical fibers to N output optical fibers of said DWDM network and has a control unit, a plurality of demultiplexers, a plurality of tunable channel units, a switch fabric and a plurality of combiners. Each demultiplexer is connected to one of the N input optical fibers and separates signals by the wavelength channels into a plurality of demultiplexer output terminals. Each tunable channel unit is connected to one of the demultiplexer output terminals associated with one of the wavelength channels and is capable of switching signals in a first wavelength channel into a second wavelength channel responsive to signals from the control unit. The switch fabric has a plurality of input terminals and output terminals, each input terminal is connected to an output terminal of one of the tunable channel units. The switch fabric has $M \times N^2$ switch points and is arranged so that a signal on any one of its input terminals can be sent to any one of its output terminals responsive to signals from the control unit. Each combiner has a plurality of input terminals connected to the output terminals of the switch fabric and an output terminal connected to one of said N output optical fibers.

DESCRIPTION OF THE SPECIFIC EMBODIMENTS

Figure 1:
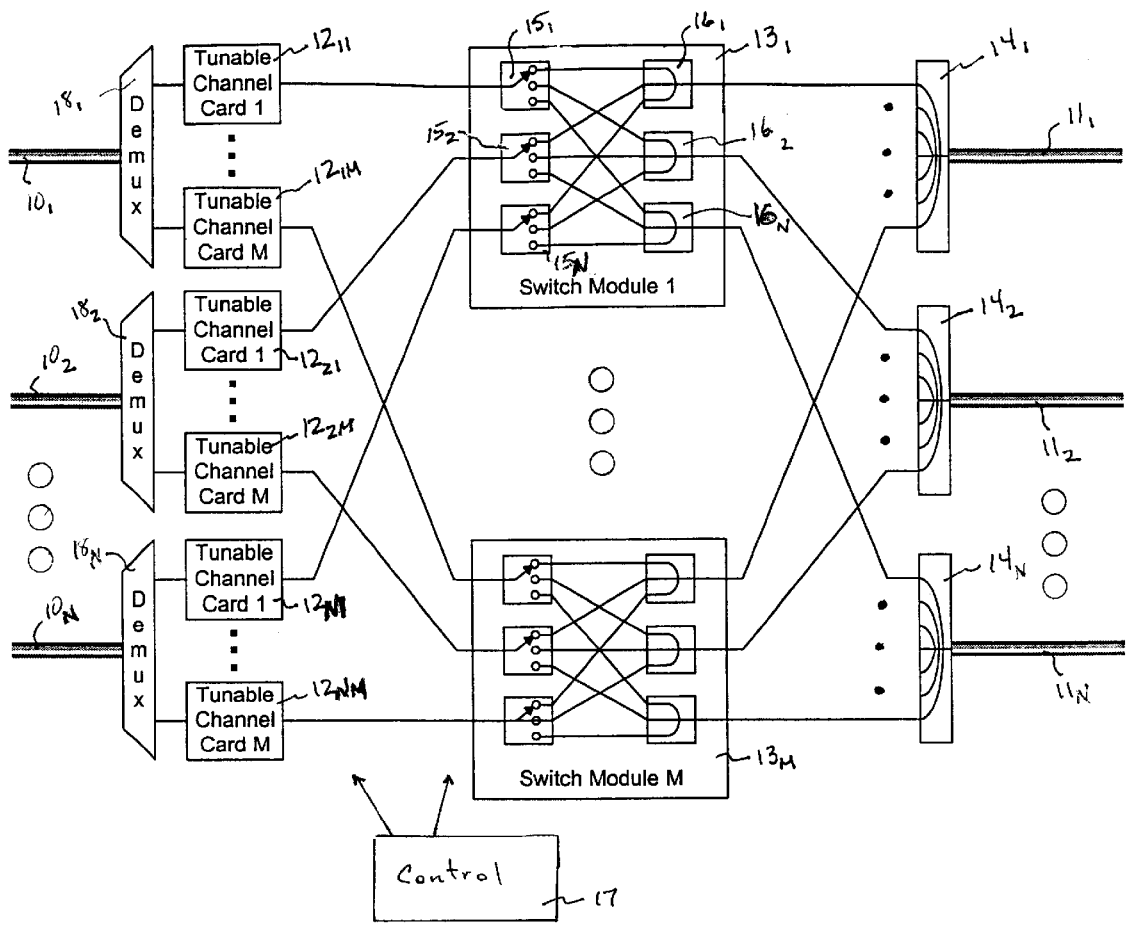
FIG. 1 is a diagram of the general architecture of a fiberoptic switch according to one embodiment of the present invention.

The general organization of a fiberoptic switch according to the present invention is illustrated in FIG. 1. The fiberoptic switch is connected in this example between N input optical fibers $10_1$–$10_N$ and N output optical fibers $11_1$–$11_N$. The input and optical fibers are assumed to be part of a DWDM fiberoptic network in which each of the optical fibers carries signals in M wavelength channels. Three input and three output fibers are illustrated in FIG. 1 to simplify the explanation of the present invention, which works equally well for any number of incoming or outgoing optical fibers and without requiring the constituent number of channels in each input and output fibers to be the same. The switch operates so that optical signals in any wavelength channel on any input fiber can be switched to any wavelength channel on any output fiber.

The fiberoptic switch of FIG. 1 has demultiplexers 18, tunable channel cards 12, a switch fabric formed by switch modules 13, combiners 14 and a control unit 17. It should be noted that ordinary reference numerals refer to elements in the drawings and subscripts to the reference numerals are used to denote the specific elements. Each of the input fibers $10_1$, $10_2$–$10_N$ are respectively connected to one of a corresponding number of demultiplexers $18_1$, $18_2$–$18_N$. Each of the demultiplexers separates the incoming optical signals by their wavelength channels. The signals of a separated wavelength channel are sent to a tunable channel card; hence for each demultiplexer $18_1$, $18_2$–$18_N$, there are M tunable channel cards, one for each wavelength channel. Each tunable channel card receives the optical signals in one wavelength channel and can translate the signals into a second wavelength channel, responsive to control signals from the control unit 17. Since there are N input fibers 10, each fiber having M channels, there are N×M tunable channel cards 12.

The tunable channel cards 12 are connected to a switch fabric, which in conventional network switching terminology, constitutes the portion of a switch which performs the actual switching function. In the case of the FIG. 1 switch, the switch fabric is formed by M N×N switch modules associated with each one of the M wavelength channels. The inputs of each of the switch modules 13 are connected to each tunable channel card associated with the wavelength channel of that switch module. In the exemplary fiberoptic switch of FIG. 1, the switch module $13_1$ which receives wavelength channel 1 is connected to tunable channel card $12_{11}$, $12_{21}$–$12_{31}$. The switch module $13_M$ receives the signals from the tunable channel cards receiving signals in the Mth wavelength channel, i.e., cards $12_{1M}$, $12_{2M}$–$12_{3M}$. Each of the switch modules 13 has each of its N outputs connected to one of the N combiners 14, which are each connected to one of the output optical fibers 11. The first output terminals of all the switch modules 13 are connected to the corresponding input terminals of the first combiner $14_1$. The second output terminals of all the switch modules 13 are connected to the corresponding input terminals of the second combiner $14_2$. This pattern is repeated for all N output terminals of each switch module $13_1$–$13_M$.

Figure 2:
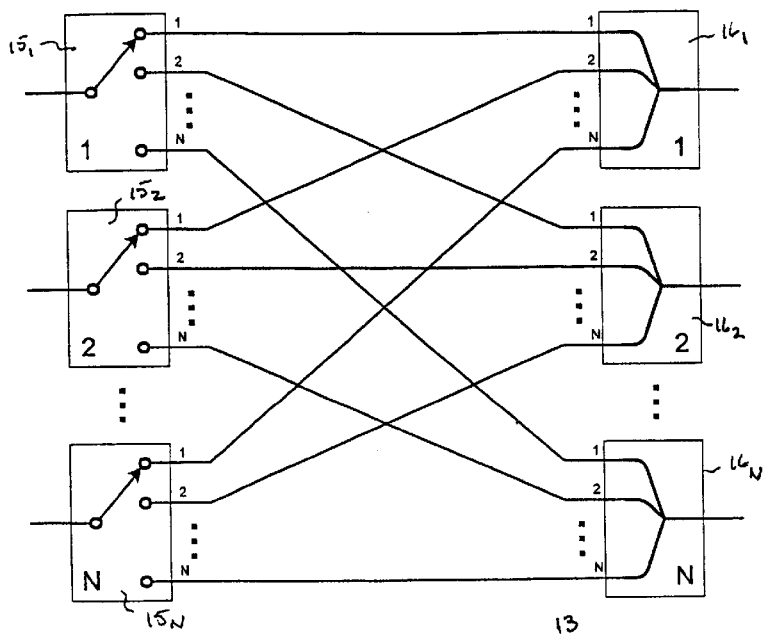
FIG. 2 is a detailed diagrammatic view of a switch module in the FIG. 1 fiberoptic switch.

The basic organization for the N×N switch module 13 is shown in more detail in FIG. 2. The N×N switch module 13 is formed from N 1-to-N switch elements 15 and N N-to-1 combiners 16. The number 1 output terminals of the switch elements 1–N are connected to the corresponding input terminals 1–N of the first combiner $16_1$. The number 2 output terminals of the switch elements 1–N are connected to the corresponding input terminals 1–N of the second combiner $16_2$. This pattern is repeated for all N output terminals of each switch element $15_1$–$15_N$. Each switch element 15 corresponds to one of the inputs to the N×N switch module 13. To connect any input terminal to a specific output terminal of the switch module 13, the switch element 15 for that input terminal is set to the position for that output terminal. In this manner, signals on any combination of input terminals of the described fiberoptic switch can be sent to any combination of output terminals, with two constraints. Any single input terminal can only be connected to a single output terminal at a time. If multiple input terminals are connected to a single output terminals, the signals on the multiple input terminals must be noninterfering (i.e., the signals must be at different wavelengths/frequencies).

Operationally, to connect an incoming signal on some input fiber 10 at a first wavelength to an output fiber 11 on a different wavelength, two operations must be performed. First, the tunable channel card 12 which is associated with the incoming signal at the first wavelength on the input fiber 10 must be tuned to translate the signal to the correct outgoing wavelength. Also, the switch module 13 associated with that tunable channel card 12 must be configured to send the signal to the correct output fiber 11. These operations of the channel cards 12 and the switch modules 13 are directed by the control unit 17. This reconfiguration process can be done fairly quickly. First, the input switch stage (i.e., the switch element 15) is turned off to disconnect the laser source in the tunable channel card 12. In an alternative arrangement, rather than switch elements 15 with off/on functions, off/on switches are placed between the switch elements 15 and the tunable channel cards 12, and the switch for the particular switch element 15 is turned off to disconnected the laser source in the tunable channel card 12. Then the laser is tuned to the new wavelength and the switch elements 15 in the corresponding switch module 13 are set to the correct states for the new configuration and the connection turned back on.

The switch architecture described above supports M wavelengths and N fibers. Each signal must pass through a 1-to-N optical switch 15 and, in effect, an M×N-to-1 combiner (the combination of the two combiners 16 and 14). The switch loss is typically less the 1 dB, but the combiner has a theoretical lower limit on the insertion loss of $$10 \times \log\left(\frac{1}{M \times N}\right) \text{dB}.$$

Figure 3:
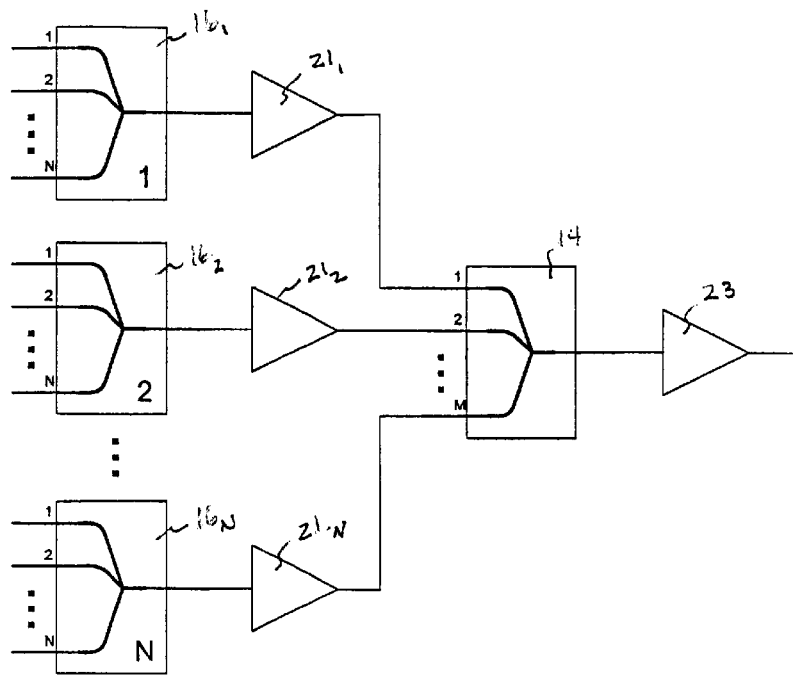
FIG. 3 is a detailed diagrammatic view of a combiner in the FIG. 1 fiberoptic switch.

In practice, the actual loss is somewhat higher. As the size of the fiberoptic switch increases, the loss reaches a level where it becomes the limiting factor for system performance. By configuring the combiner function with one or more mid-stage amplifiers, such as shown in FIG. 3, the noise increase can be managed to acceptable levels. In the exemplary arrangement of FIG. 3, optical amplifiers 21 are placed between the combiners 16 of the switch modules 13 and the combiner 14. Furthermore, another set of optical amplifiers 23 are inserted between the output terminals of the combiner 14 and the output optical fibers 11. Note that while FIG. 3 shows a division into two levels of combination, in actual practice the size of combiner and the total number of combiners are selected to optimize the optical performance.

A fiberoptic switch according to the present invention has many advantages. A traditional crossbar switch with M×N input terminals requires a total of (M×N)×(M×N) cross-points in the switch. On the other hand, the fiberoptic switch described above requires N cross-points (a single 1×N switch 15) for each tunable channel card 12. The switch requires M×N tunable channel cards 13, so that only a total of N×(M×N) or M×N² cross-points are required. With M and especially N being large numbers, this is a considerable savings in complexity.

Furthermore, the switch architecture allows the capacity of the switch to be increased without unduly affecting the operation of the switch. The switch described above uses a separate switching module 13 for each wavelength channel. By partitioning the switching modules 13 onto separate physical modules, the switch can be incrementally expanded by adding the common switching equipment for one wavelength at a time. Furthermore, the physical capacity of the switch can be expanded without unduly affecting the operation of the switch. By reserving one channel for redundancy or as a spare, it is possible to switch one channel at a time to the redundant switch module. Once switched to the redundant switch, the primary switch module 13 can be replaced with one of a larger capacity, i.e., N is larger. The wavelength channel can then be switched back to the new, larger capacity, primary module. This process is then repeated for each channel and each switch module 13 until the capacity of the entire switch has been increased.

Figure 4:
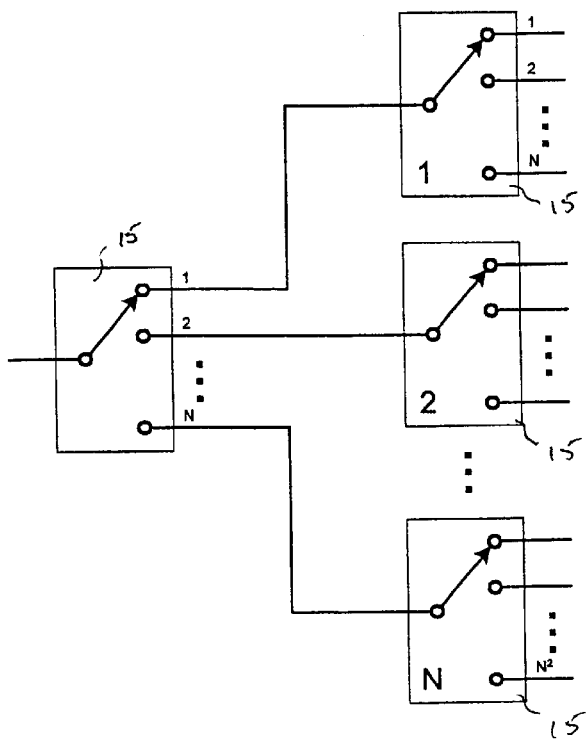
FIG. 4 is a diagram of cascade-connected switch elements according to the present invention.

The modularity of a switch according to the present invention can be further advantageously expanded. As described above, the basic switching module 13 uses 1-to-N switch elements 15. However, technical constraints may place an upper limit on N for a single physical device where N is below the desired number of switched optical fibers for a particular application. The implementation shown in FIG. 4 allows an N²×N² switch to be built from 1-by-N switch elements 15 connected in a two-level cascade. For example, 16×16 switching modules 13 can be created from 1-by-4 switch elements 15. The principle can be extended to an arbitrary level D such that a $N^D \times N^D$ switch elements (and fiberoptic switch) can be built from cascade-connected 1-by-N switch elements 15.

Figure 5A:
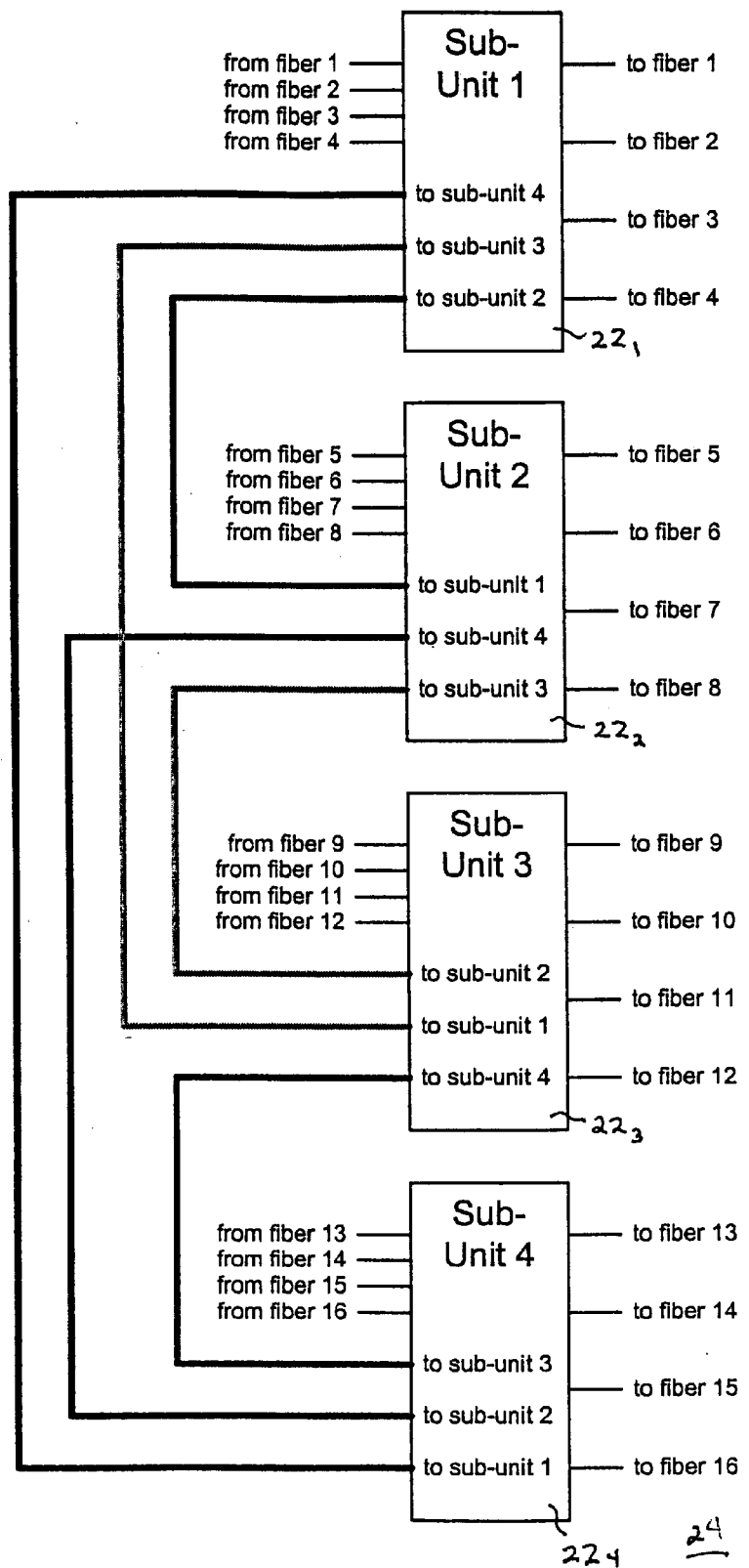
FIG. 5A illustrates the organization of a modularized 4×4 switch module.

This modularity in switch elements 15 (and the switch modules 13) allows the switch fabric of the fiberoptic switch to be incrementally increased with no impact upon the signals passing through the switch, according to the present invention. The switching module 13 described above requires that all of the cross-points in the 1-to-N switch elements 15 be fully populated at the time the switch is built, because it is created from a monolithic switch element 15. The partitioning scheme described in the previous paragraph provides for the decomposition of the switch element 15 into multiple smaller switch elements. By combining the switch element 15 decomposition discussed immediately above with the basic switch element described with respect to the FIG. 1 switch, it is possible to separate the switch module 13 into multiple subelements, which can be incrementally combined as required. One such decomposition of a 16×16 switch module 24 is shown in FIG. 5A, which is formed from four interconnected subunits $22_1$–$22_4$. The complete 16×16 switch module 24 is functionally equivalent to the basic switch module 13 described above with respect to the FIG. 1 switch.

Figure 5B:
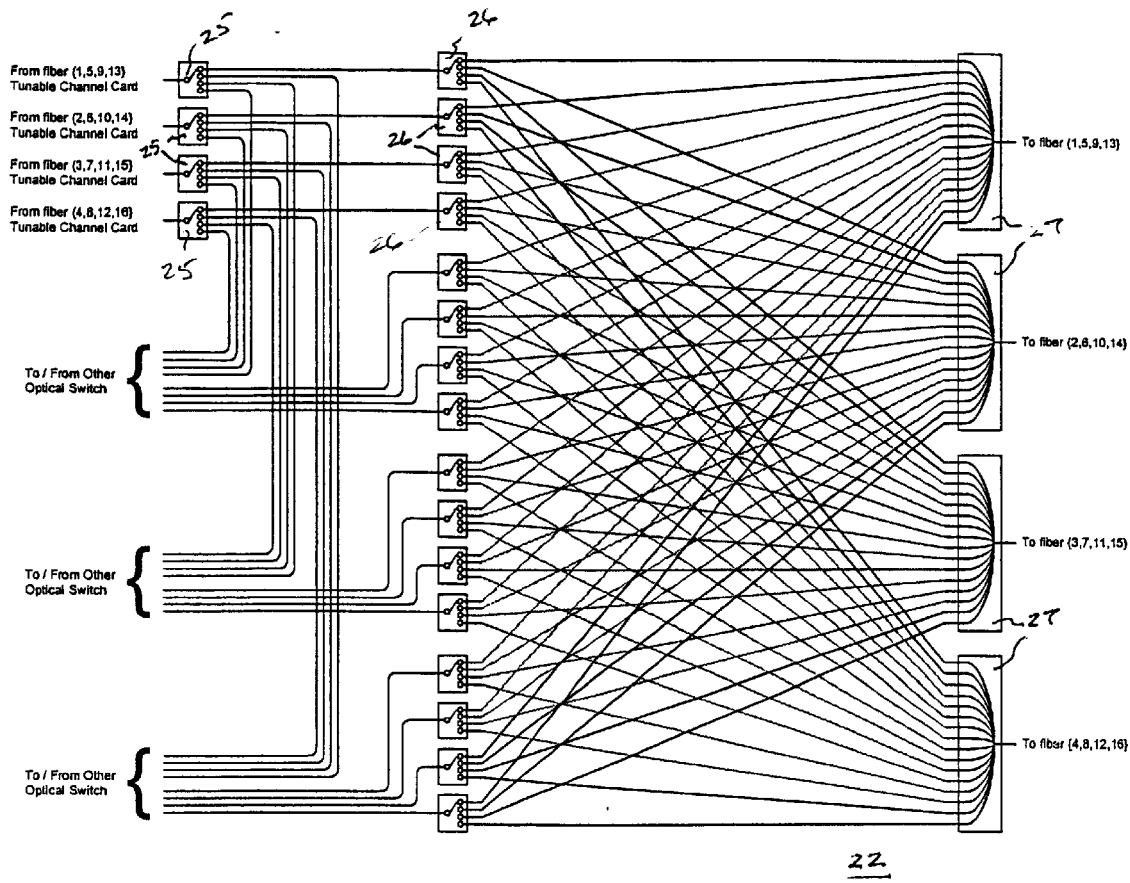
FIG. 5B illustrates the details of one of the subunits of the FIG. 5A modularized switch module.

The detailed organization of one of the subunits $22_1$–$22_4$, which represents ¼ of the 16×16 switch module 24, is illustrated in FIG. 5B. Each subunit $22_1$–$22_4$ contains the first stage switch elements 25 for the inputs associated with that subunit. The subunit $22_1$–$22_4$ also contains the second stage switch elements 26 for the outputs associated with that subunit. In the example shown, a single subunit $22_1$ supports up to four input fibers and output fibers. By adding a second subunit $22_2$, the total capacity is expanded to eight input fibers and output fibers. Because all of the switch elements 25, 26 and combiners 27 required to support the 4×4 switch capacity are contained on the first subunit $22_1$, no rearrangements or disruptions of connections are required when expanding the switch to an 8×8 capacity. Likewise, since all of the switch elements and combiners required to support the 8×8 switch capacity are contained within the first two subunits $22_1$ and $22_2$, no rearrangements or disruptions of connections are required when the third subunit $22_3$ is added.

Figure 5C:
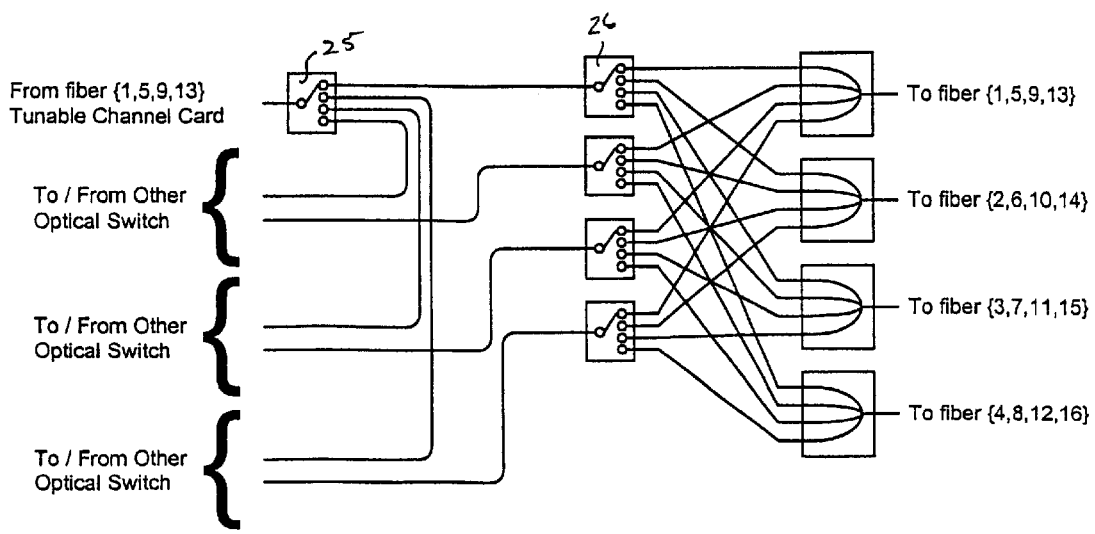
FIGS. 5C and FIG. 5D illustrate how the FIG. 5A modularized switch module can be further modularized by partitioning the combiners of the switch module.
Figure 5D:
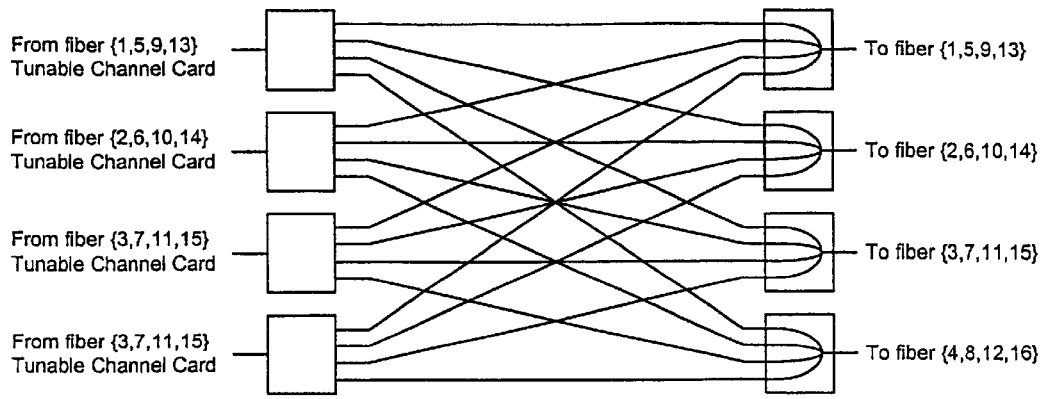

Further modularization is possible by partitioning the combining function into multiple, cascaded combiners. FIG. 5C shows a subunit $22_1$–$22_4$ described with respect to FIGS. 5A and 5B partitioned even further, to a single channel element. Four of these single channel elements must be combined as shown in FIG. 5D using four 4-to-1 combiners to form the four channel subunit of the 16×16 switch. This combination is functionally equivalent to the subunit $22_1$–$22_4$ described above.

Figure 6A:
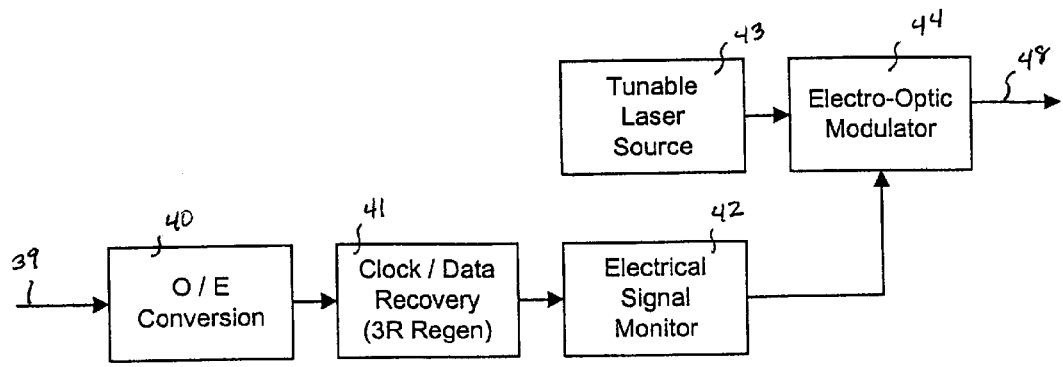
FIG. 6A is a block diagram of the tunable channel card for the FIG. 1 switch.

FIG. 6A shows a functional block diagram of the tunable channel card 12. The incoming optical signals 39 from a demultiplexer 18 (see FIG. 1) are first received by an optical-to-electrical converter 40 and the resulting electrical signals are then sent to a clock/data recovery circuit 41 for regeneration. At this point, monitoring circuitry 42 is used to detect problems with the signal. The details of the monitoring circuitry 42 vary with the signal characteristics. After monitoring, the signal is encoded onto the tunable laser source 43 for optical output signals 48 for the switch fabric and switch modules 13. In the FIG. 6A arrangement, an external modulator 44 is used to modulate the tunable laser source 43, but direct modulation of the laser source could be also used if suitable for the particular application.

Figure 6B:
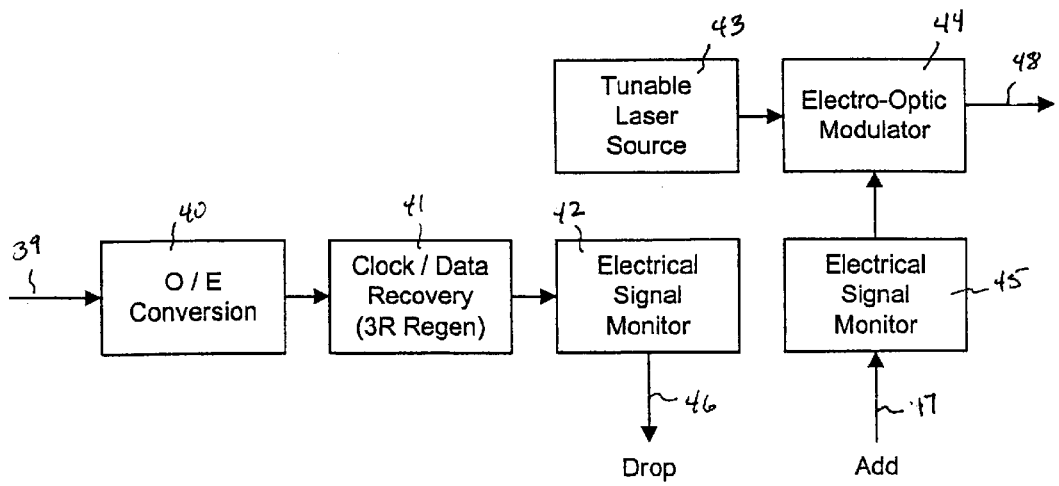
FIG. 6B is a block diagram of an alternate embodiment of the FIG. 6A tunable channel card.

To provide an add/drop capability, the tunable channel card 12 is easily modified as shown in FIG. 6B. After monitoring, the incoming electrical signal is sent to a drop port 46. An add port 47 is provides input signals to a second monitoring circuitry 45 which is used to modulate output of the tunable laser source 43 to generate the outgoing optical signals 48. Thus, the incoming optical signal can be dropped and replaced with a new added signal, implementing the optical add/drop capability of the switch. It should be noted that the signals of the drop port 46 and the add port 47 are electrical to provide easy connection of the fiberoptic switch and its connected DWDM network to an electronic network. Additionally, the functionality of the optical add/drop operation is incorporated into the equipment which is normally associated with the wavelength routing operation of the switch, i.e., the tunable channel cards 12. This arrangement avoids external equipment for the add/drop functionality. Hence, the required circuitry, and thus the cost, associated with the optical interface normally used to connect the external equipment to the wavelength routing operations of a fiberoptic switch is eliminated.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. For an-optical network having a plurality of optical fibers, each optical fiber carrying M wavelength channels, a DWDM network switch for controllably switching signals on N input optical fibers to N output optical fibers of said optical network, said DWDM network switch comprising a control unit;

a plurality of demultiplexers, each demultiplexer connected to one of said N input optical fibers, said demultiplexer separating signals by said wavelength channels into a plurality of demultiplexer output terminals;

a plurality of tunable channel units, each tunable channel unit connected to one of said demultiplexer output terminals associated with one of said wavelength channels, said tunable channel unit capable of switching signals in a first wavelength channel into a second wavelength channel, the second wavelength channel being selectable from a plurality of available wavelength channels, responsive to signals from said control unit;

a switch fabric having a plurality of input terminals and output terminals, each input terminal connected to an output terminal of one of tunable channel units, said switch fabric having M×N² switch points and arranged so that a signal on any one of said input terminals in any wavelength can be sent to any one of said output terminals in any wavelength responsive to signals from said control unit; and a plurality of combiners, each combiner having a plurality of input terminals connected to said output terminals of said switch fabric and an output terminal connected to one of said N output optical fibers, wherein said switch fabric further comprises a plurality of switch modules, each switch module having a plurality of input terminals and output terminals, each input terminal connected to one of a plurality of tunable channel units associated with the same wavelength channel, said output terminals connected to said input terminals of each one of said combiners, and wherein each of said switch modules comprises N 1-to-N switch elements, each switch element having one input terminal connected to a tunable channel unit and N output terminals;

N N-to-1 combiners, each combiner having N input terminals and one output terminal, each input terminal connected to an output terminal of one of said switch elements, said output terminal connected to an input terminal of said combiner connected to one of said output optical fibers, and wherein "combiner" means a device for directing light from at least two inputs to at least one output wherein the inputs are capable of accepting light of any wavelength within a band of interest, and wherein light from multiple inputs having substantially the same wavelength is capable of being directed to the output substantially simultaneously.

2. The DWDM network switch of claim 1 wherein each of said switch modules is arranged so as to be further partitionable into subunits having switch elements and combiners.

3. The DWDM network switch of claim 1 further comprising a plurality of first optical amplifiers, each first optical amplifier connected between an output optical fiber and an output terminal of one of said combiners.

4. The network switch of claim 3 further comprising a plurality of second optical amplifiers, each second optical amplifier connected between an input terminal of one of said combiners and an output terminal of one of said switch modules.

5. For an optical network having a plurality of optical fibers, each optical fiber carrying M wavelength channels, a network switch for controllably switching signals on N input optical fibers to N output optical fibers of said optical network, said network switch comprising a plurality of N demultiplexers, each demultiplexer having an input and M output terminals, said input connected to one of said N input optical fibers and separating signals of each channel into one of said output terminals;

a plurality of up to M×N tunable channel units, each tunable channel unit connected to one of said output terminals of said plurality of demultiplexers, each tunable channel unit capable of changing signals of any wavelength channel into signals of any wavelength channel responsive to control signals;

a plurality of up to M switch modules, each switch module having N input terminals and N output terminals, each of said input terminals connected to a tunable channel unit connected to each of said demultiplexers, said switch module capable of switching signals on any one of said N input terminals to any one of said N output terminals; and a plurality of N combiners, each of said combiners having M input terminals and an output terminal connected to one of said output optical fibers, each input terminal connected to each one of said output terminals of said switch modules, wherein each of said switch modules comprises N switch elements, each switch element having N output terminal and an input terminal forming a switch module input terminal, said switch element capable of switching signals on said input terminal to any one of said output terminals; and N combiners, each combiner having an output terminal forming a switch module output terminal and N input terminals, each input terminal connected to an output terminal of each one of said switch elements, and wherein "combiner" means a device for directing light from at least two inputs to at least one output wherein the inputs are capable of accepting light of any wavelength within a band of interest, and wherein light from multiple inputs having substantially the same wavelength is capable of being directed to the output substantially simultaneously.

6. The network switch of claim 5 wherein each of said switch modules comprises unitary unit.

7. The network switch of claim 5 further comprising a plurality of first optical amplifiers, each first optical amplifier connected between an output optical fiber and an output terminal of one of said combiners.

8. The network switch of claim 5 further comprising a plurality of second optical amplifiers, each second optical amplifier connected between an input terminal of one of said combiners and an output terminal of one of said switch modules.

9. The network switch of claim 8 further comprising a plurality of first optical amplifiers, each first optical amplifier connected between an output optical fiber and an output terminal of one of said combiners.

* * * * *